J. L. CREVELING.
ELECTRIC REGULATION.
APPLICATION FILED NOV. 1, 1916.

1,353,319.

Patented Sept. 21, 1920.

Inventor;
John L. Creveling

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

1,353,319.　　　　　Specification of Letters Patent.　　Patented Sept. 21, 1920.

Application filed November 1, 1916. Serial No. 128,827.

*To all whom it may concern:*

Be it known that I, JOHN L. CREVELING, a citizen of the United States, residing in White Plains, county of Westchester, and State of New York, have invented certain new and useful Improvements in Electric Regulation, of which the following is a description.

My invention pertains to that class of electric regulation wherein it is desired to automatically regulate a generator, and has for a particular object to provide means whereby the same will be efficiently accomplished.

My invention is particularly applicable to systems wherein a dynamo or generator is used to charge a storage battery and operate lamps or other translating devices and wherein it is desired to limit the current in a circuit supplied by the generator, or the voltage across a circuit supplied by the generator throughout wide changes in speed, and it will therefore be described with reference to such a system.

Figure 1:
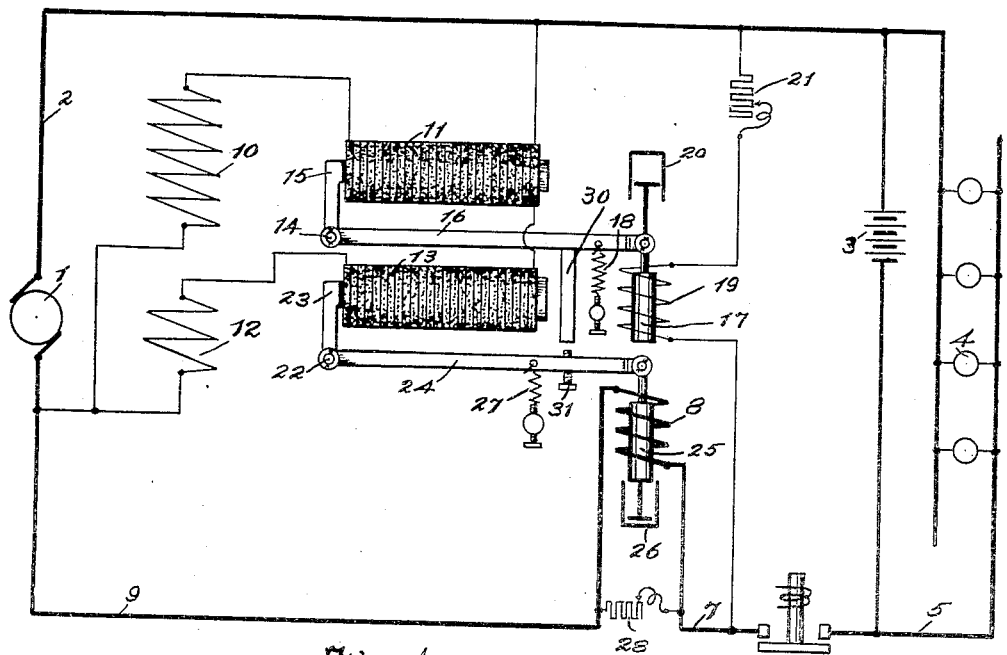
Figure 2:
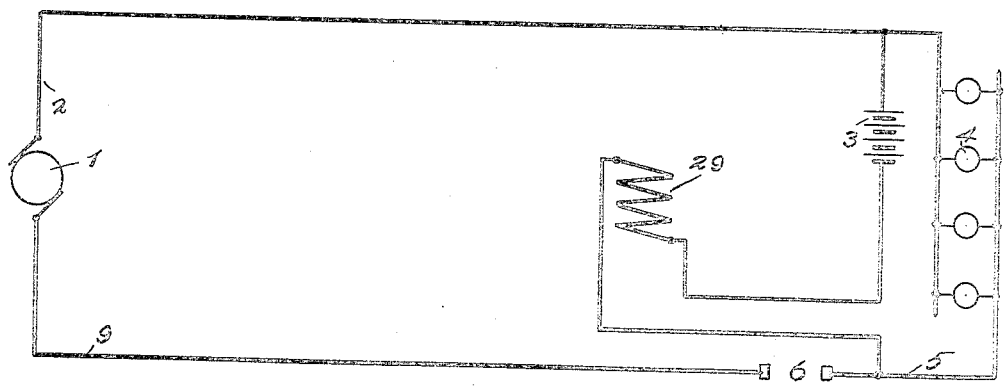

Figure 1 is a diagrammatic representation of such a system illustrating one embodiment of my invention; and Fig. 2 is a diagrammatic representation illustrating a modification which may be made in the system of Fig. 1.

In the drawing, 1 represents a dynamo or generator having the positive lead 2 in communication with the positive terminals of the storage battery 3 and lamps or other translating devices 4. The storage battery and translating devices have their negative terminals connected by lead 5 with one side of a suitable switch 6, the opposite side of which is connected as by lead 7 with one end of the solenoid or winding 8, the opposite end of which is connected as by wire 9 with the negative side of the generator 1. The generator is provided with a field coil 10, indicated as a shunt coil, having in series therewith a controllable resistance 11, indicated as of the carbon pile variety for the purpose of illustration. The generator is also provided with a shunt field coil 12 having in series therewith a controllable resistance 13, also indicated for example as of the carbon pile type. It will therefore be obvious that manipulation of the pressure upon the carbon piles 11 and 13, by varying the resistance thereof, will affect the field of the generator.

The stud or pivot 14 carries a bell-crank lever composed of the short arm 15 and the long arm 16. The free extremity of the arm 16 has pivotally connected therewith a core of iron or other magnetic material indicated at 17, and is normally drawn in a downward direction as by the spring 18 which tends to increase the pressure upon the pile 11. 19 is a coil across the circuit whose voltage it is desired to prevent from exceeding a predetermined limit, and in this instance is indicated as across the generator circuit and therefore responsive to fluctuations in generator voltage. When energized, the coil 19 tends to lift the core 17 and decrease the pressure upon the pile 11 and increase the resistance thereof, while too sudden movement is prevented by the dashpot mechanism indicated at 20. 21 is a variable resistance which may be used for adjusting the operation of coil 19. 22 is a pivot or stud carrying the bell-crank lever comprising the short arm 23 and the long arm 24, said arm 24 carrying at its free extremity a core of iron or other magnetic material indicated at 25, which is pivotally united to the said arm and surrounded by the coil 8 in such manner that the said coil when energized tends to raise the core 25 against the action of the dashpot arrangement 26 and decrease the pressure upon the pile 13 and increase the resistance thereof. 27 is an adjustable spring normally tending to draw the lever 24 downwardly and increase the pressure upon the pile 13. 28 is an adjustable resistance in shunt across the coil 8 whereby the operation of the said coil may be adjusted. The lever 16 is provided with a fixed member 30, and lever 24 is provided with an adjustable screw 31 adapted to engage the member 30 in a manner and for a purpose to be hereinafter described.

In Fig. 2 like numerals are used to indicate like parts, and the only modification intended to be brought out by this figure resides in the coil 29 which is in series with the storage battery and which may be substituted in place of the coil 8 of Fig. 1 which is in series with the generator.

The switch 6 may be of any suitable type, and I prefer to use one of the usual automatic switches which will close its circuit when the voltage of the generator is substantially equal to that of the storage battery and open the circuit when the generator voltage falls very slightly below that of the battery, in such manner as to prevent back discharge from the battery through the generator. As these switches are well known in the art, and the particular type used forms no part of my present invention, details are purposely omitted for the sake of brevity.

An operation of my invention is substantially as follows:

If the generator be at rest or running at too low speed, switch 6 will be open and the translating devices may be supplied by the storage battery 3 in a well known manner. If the generator have its voltage brought to slightly in excess of that of the storage battery, switch 6 will close and current will flow from the generator through lead 2 to the storage battery 3 and lamps or other translating devices 4, from which return is made through wire 5, switch 6, lead 7, coil 8 and lead 9 to the generator. A portion of the current, if desired, may, of course, be diverted from coil 8 by means of the adjustable shunt 28. And I so adjust shunt 28 and spring 27 that when the maximum desired current is reached in the coil 8, any further tendency to increase, as for example upon increases in speed of the generator, will cause coil 8 to lift the core 25 smoothly against the action of dashpot 26 and spring 27, so as to lessen the pressure upon the pile 13 and increase the resistance thereof to cut down the field current in the coil 12 and thereby hold this maximum desired current from being exceeded. If the current fall below the normal, the reverse operation will take place, tending to restore the same to the normal value.

I so adjust the resistance 21 and the spring 18 that in case the voltage across the circuit measured by the coil 19 tends to increase above the predetermined desired limit, the said coil will raise core 17 evenly against the action of dashpot 20 and spring 18, in such manner as to raise lever 16 and increase the resistance of the pile 11 and cut down the excitation of coil 10 and prevent this desired maximum voltage from being exceeded. If while so operating this voltage should tend to cause too great a current to be delivered by the generator, coil 8 will raise core 25 and increase the resistance 13 and tend to cut down the generator voltage until only sufficient to deliver the maximum desired current. And if manipulation of the resistance 13 be insufficient, when increased to a predetermined value to hold the current from exceeding the desired maximum, as for example if the speed of the generator be increased until the withdrawal of coil 12 altogether be insufficient to hold the generator current below the desired maximum, I so adjust screw 31 that by coming in contact with the member 30 it will allow coil 8 to raise lever 16 and, by manipulating pile 11, so reduce the generator voltage that the maximum current will not be exceeded. And with a system similar to that shown in Fig. 1, employing a storage battery wherein the generator is apt to have its speed raised sufficiently that it will require less than half of its normal field excitation, I prefer in practice to make the coil 10 a more powerful coil than coil 12, supplying a sufficient portion of the field excitation that the voltage regulator when acting alone will be able, through the instrumentality of resistance 11, to hold the voltage across the generator within the desired limits to be met in practice. Then the assistance of the current regulator, by acting upon pile 13, will cause the current to be held from exceeding the desired limit. And if the current regulating means be insufficient at any time, owing say to high speed, to cut down the field excitation sufficiently by manipulation of the current in the coil 12, it will do so by affecting the current in the coil 10 also, through the instrumentality of screw 31 and member 30. And it will be noted that in the normal operation a great portion of the regulating effects will be carried out by the manipulation of the resistance in circuit with one of the two field windings, and that this will effect a considerable reduction of the heat dissipated in the regulating means over an arrangement wherein one field coil is employed and the total current therein varied by means of a resistance, the heat waste of which may be measured in terms of the total field current.

The operation of the modification intended to be brought out by the diagram in Fig. 2 is substantially the same as that outlined above, with the exception that it is the current in the battery circuit that is limited by the current responsive means, instead of the total generator current as is the case in Fig. 1.

In this application I have not sought to claim the use of a plurality of field exciting means having independent regulators controlling the same, from its broadest aspect, as such is within the subject-matter of my co-pending application for improvement in electric regulation, Serial No. 128,826, filed November 1, 1916.

I do not wish in any way to limit myself to any of the exact constructions or details of operation given above to illustrate one embodiment of my invention, for it will be obvious that wide departure may be made without departing from the spirit and scope thereof.

What I claim is:

1. The combination with a generator provided with a plurality of field exciting means, of automatic means for regulating the generator by separately and also collectively affecting a plurality of exciting means.

2. The combination with a generator having a plurality of field energizing means, of a plurality of automatic regulating means for independently affecting the same, and means whereby said last named means coöperate.

3. The combination with a generator provided with a plurality of electromagnetic energizing means affecting the operation thereof, of a plurality of automatically responsive regulating means independently capable of affecting the energizing means, and means whereby a plurality thereof coöperate to regulate the generator under predetermined conditions.

4. The combination with a generator and a plurality of automatically responsive regulating means, of a plurality of field affecting means independently affected by certain regulating means, and means whereby one of the regulating means may affect a plurality of the field affecting means.

5. The combination with a generator and a plurality of automatic regulating means responsive to the operation of the generator, of field affecting means independently affected by certain regulating means, and means whereby one of the regulating means may affect a plurality of the field affecting means by coöperating with another of the regulating means.

6. The combination with a generator provided with a plurality of field exciting means, of a plurality of regulating means collectively affecting a plurality of said exciting means and collectively responsive to a plurality of functions of said generator, and means whereby one of said regulating means affects another of said regulating means.

7. The combination with a generator provided with a plurality of field affecting means, of a regulator for affecting one of said affecting means responsive to voltage fluctuations, a regulator for affecting another of said field affecting means responsive to current fluctuations, and means whereby one responsive means affects a plurality of the regulators.

8. The combination with a generator provided with a plurality of field exciting means, a storage battery charged thereby, a regulator for affecting one of said exciting means responsive to voltage fluctuations, a regulator for affecting another of said field exciting means responsive to current fluctuations, and means whereby fluctuations in one of said regulators affects the other regulator during charging of the battery.

9. The combination with a generator having a plurality of field energizing coils, means for controlling the energization of one of said coils in response to current fluctuations, and means for controlling the energization of another of said coils in response to voltage fluctuations, of means whereby one responsive means affects another responsive means.

10. The combination with a generator having a plurality of field energizing coils, a regulator in series with one of said coils, voltage responsive means for operating said regulator, a regulator in series with another of said coils, and current responsive means for operating said last named regulator, of means whereby the current responsive means affects the voltage responsive regulator.

11. The combination with a generator having a plurality of field energizing coils and a storage battery charged thereby, means for controlling the current in one of said energizing coils comprehending a voltage responsive regulator, and means for controlling the current in another of said energizing coils comprehending a current responsive regulator, of means whereby the current responsive regulator affects the voltage responsive regulator whereby the current to the battery and the voltage impressed upon the same are held from exceeding predetermined limits.

12. The combination with a generator having a principal field energizing means and voltage responsive means controlling the operation thereof, of an auxiliary field exciting means and a current responsive regulator for controlling the operation thereof.

13. The combination with a generator having a principal field energizing means and voltage responsive regulator controlling the operation thereof, of an auxiliary field exciting means, a current responsive regulator for controlling the operation thereof, and means whereby one of said regulators may affect the other regulator.

14. The combination with a generator having a principal field energizing means and voltage responsive regulator controlling the operation thereof, of an auxiliary field energizing means, a current responsive regulator for controlling the operation thereof, and means whereby the regulator controlling the auxiliary field exciting means may affect the regulator controlling the principal energizing means.

15. The combination with a generator provided with a major field exciting coil, means for controlling the current therein comprehending a voltage responsive regulating means, a minor field exciting coil and means for controlling the current therein comprehending a current responsive regulating means.

16. The combination with a generator provided with a major field exciting coil, means for controlling the current therein comprehending a voltage responsive regulating means, a minor field exciting coil, means for controlling the current therein comprehending a current responsive regulating means and means whereby said regulating means coöperate in the regulation of the generator.

17. The combination with a generator provided with a major field exciting coil, means for controlling the current therein comprehending a voltage responsive regulating means, a minor field exciting coil, means for controlling the current therein comprehending a current responsive regulating means and means whereby said regulating means coöperate in the regulation of the generator to limit the current and voltage supplied thereby.

18. The combination with a storage battery, a variable speed generator supplying the same and provided with a major field exciting means and means controlling the same in response to voltage fluctuations across the battery, of a minor field exciting means and means for controlling the same in response to fluctuations in current supplied by the generator to the battery.

19. The combination with a storage battery, a variable speed generator supplying the same and provided with a major field exciting means and means controlling the same in response to voltage fluctuations across the battery, of a minor field exciting means, means for controlling the same in response to fluctuations in current supplied by the generator to the battery and means whereby the current responsive means affects the controlling means of the major field energizing means.

20. The combination with a generator, a regulator therefor responsive to voltage fluctuations and a regulator therefor responsive to current fluctuations, of means whereby one of said regulators affects the other regulator to extend the range of its own regulating function.

21. The combination with a generator, a regulator therefor responsive to voltage fluctuations and a regulator therefor responsive to current fluctuations, of means whereby the current responsive regulator affects the voltage responsive regulator to extend the range of current regulation beyond that of the current regulator alone.

22. The combination with a generator, a regulator therefor responsive to voltage fluctuations and a regulator therefor responsive to current fluctuations, of means whereby one of said regulators when responding to fluctuations in the quantity measured thereby may affect the other regulator to extend the range of effect upon the generator caused by fluctuations in said quantity.

23. The combination with a variable speed dynamo, means for regulating the same in response to voltage fluctuations throughout speed changes, means for regulating the dynamo in response to current fluctuations below a predetermined limit, and means whereby the current regulating means affects the voltage regulating means to regulate the dynamo for fluctuations in current tending to take place beyond the limit of regulation of the current regulating means alone.

24. The combination with a variable speed dynamo, a storage battery charged thereby, means for regulating the dynamo in response to voltage fluctuations throughout speed changes, means for regulating the dynamo in response to current fluctuations throughout certain speed changes, and means whereby the current responsive means affects a portion of the voltage responsive regulating means to regulate the dynamo for fluctuations in current tending to take place beyond its limit of regulation alone whereby the current and voltage supplied to said battery are held within predetermined limits throughout all speed increases of said dynamo.

25. The combination with a generator having a principal field energizing means and a regulator controlling the same, of an auxiliary field exciting means and a regulator controlling the same, and means whereby one of said regulators may affect the other regulator.

26. The combination with a generator having a principal field energizing means and a regulator controlling the same, of an auxiliary field energizing means and a regulator for controlling the same, and means whereby the regulator controlling the auxiliary field exciting means may affect the regulator controlling the principal energizing means.

27. The combination with a generator provided with a major field exciting means, means for controlling the same responsive to one factor of the output of the generator, a minor field exciting means and means for controlling the same responsive to another factor of the output of the generator.

28. The combination with a generator provided with a major field exciting means, means for controlling the same responsive to one factor of the output of the generator, a minor field exciting means and means for controlling the same responsive to another factor of the output of the generator, and means whereby the controlling means coöperate in the regulation of the generator.

29. The combination with a generator, a regulator therefor responsive to fluctuations in one factor of the output of the generator and a regulator therefor responsive to fluctuations in another factor of the output of the generator, of means whereby one of said regulators affects the other regulator to extend the range of its own regulating function.

30. The combination with a generator, a regulator therefor responsive to certain fluctuations and a regulator therefor responsive to other fluctuations, of means whereby one of said regulators affects the other regulator to extend its own range of regulation in response to fluctuations affecting the same.

31. The combination with a generator, a regulator therefor responsive to certain fluctuations and a regulator therefor responsive to other fluctuations, of means whereby one of said regulators when responding to the fluctuations measured thereby may affect the other regulator to extend its own range of effect upon the generator in response to said fluctuations.

32. The combination of a variable speed dynamo, means for regulating the same in response to certain fluctuations throughout speed changes, means for regulating the dynamo in response to other fluctuations below a predetermined limit, and means whereby the second mentioned regulating means affects the first mentioned regulating means to regulate the dynamo for fluctuations tending to take place beyond the limit of regulation of said second mentioned regulating means alone.

33. The combination with a variable speed dynamo, a storage battery charged thereby, means for regulating the dynamo in response to certain fluctuations throughout speed changes, means for regulating the dynamo in response to other fluctuations throughout certain limited speed changes, and means whereby the second mentioned responsive means affects a portion of the first mentioned responsive means to regulate the dynamo for fluctuations tending to take place beyond the limit of control of the second mentioned responsive means alone whereby the range of the second mentioned responsive means is extended to control the generator in charging the battery.

JOHN L. CREVELING.